United States Patent [19]
Taylor et al.

[11] Patent Number: 5,133,842
[45] Date of Patent: Jul. 28, 1992

[54] ELECTROCHEMICAL CELL HAVING ELECTRODE COMPRISING GOLD CONTAINING ELECTROCATALYST

[75] Inventors: Earl J. Taylor, Chelmsford, Mass.; Gary A. Moniz, Windham, N.H.

[73] Assignee: Physical Sciences, Inc., Andover, Mass.

[21] Appl. No.: 670,200

[22] Filed: Mar. 15, 1991

Related U.S. Application Data

[60] Division of Ser. No. 434,898, Nov. 13, 1989, Pat. No. 5,041,195, which is a continuation-in-part of Ser. No. 272,783, Nov. 17, 1988, abandoned.

[51] Int. Cl.⁵ .................. C25B 1/16; C25B 11/08
[52] U.S. Cl. .................. 204/98; 204/290 R; 204/252; 429/27; 429/44
[58] Field of Search .............. 204/290 R, 292, 294, 204/431, 432, 98, 128, 252; 429/27, 44

[56] References Cited

U.S. PATENT DOCUMENTS

| | | | |
|---|---|---|---|
| 3,239,382 | 3/1966 | Thompson | 429/44 |
| 3,467,554 | 9/1969 | Forten et al. | 136/86 |
| 3,506,494 | 4/1970 | Adlhart | 136/86 |
| 3,510,355 | 5/1970 | Fishman | 136/86 |
| 3,668,014 | 6/1972 | Katsoulis | 136/120 |
| 3,701,687 | 10/1972 | Grubb et al. | 136/86 R |
| 3,776,776 | 12/1973 | Petrow | 427/115 |
| 4,127,468 | 11/1978 | Alfenaar et al. | 204/384 |
| 4,407,905 | 10/1983 | Takeuchi et al. | 429/42 |
| 4,407,906 | 10/1983 | Stonehart | 429/42 |
| 4,440,617 | 4/1984 | Solomon | 204/290 R |
| 4,454,649 | 6/1984 | Jalan et al. | 29/623.5 |
| 4,456,521 | 6/1984 | Solomon | 204/292 |
| 4,457,986 | 7/1984 | Bindra et al. | 429/40 |
| 4,461,814 | 7/1984 | Klinedinst | 429/42 |
| 4,614,692 | 9/1986 | Kajiyama et al. | 429/44 |
| 4,615,954 | 10/1986 | Solomon | 429/27 |
| 4,711,829 | 12/1987 | Luczak et al. | 429/44 |

OTHER PUBLICATIONS

J. Singer et al., "Evaluation Parcemeters for Alkaline Fuel Cell Oxygen Electrode" NASA Technical Memorandum 87155 (Nov. 1985).

*Primary Examiner*—John Niebling
*Assistant Examiner*—Kathryn Gorgos

[57] ABSTRACT

The disclosed electrocatalyst material is useful in electrodes, especially in cathodes for the reduction of oxygen or peroxide to water or hydroxide. The electrocatalyst typically comprises 0.1 to 20 weight-%, based on the weight of the material, of a supported particulate elemental gold wherein the particles are apparently crystalline in nature, apparently with exposed (100) faces, but smaller in size than 5 nanometers (<Å). These tiny monocrystals of gold are supported on carbon black or particulate conductive ceramic-like compounds having a B.E.T. surface area of at least 50 m²/g. The supported gold monocrystals appear to be selective for the reductions described above, and performance in air- or $O_2$-cathodes is outstanding, e.g. >0.7 volts vs. RHE at 200 mA/cm², generally indicating a substantial proportion of four-electron change reactions when oxygen is being reduced. The electrodes (which are also useful as anodes in acid electrolytes) are made by impregnating the support material with a reducible gold compound dissolved in a polar solvent, gently evaporating the solvent, and chemically reducing the gold compound in situ at a moderate temperature with a flowing reducing gas (e.g. $H_2$) then applying the resulting supported gold to a porous backing material. Typical gold content levels at the electrode surface are <2 mg/cm². Cathodes of this invention are useful in various types of air or oxygen-depolarized cells, alkaline fuel cells, metal/air cells, metal/$H_2O_2$ cells, oxygen sensors, electrochemical caustic concentrators, etc.

13 Claims, 1 Drawing Sheet

ELECTROCHEMICAL CELL HAVING ELECTRODE COMPRISING GOLD CONTAINING ELECTROCATALYST

Work related to this invention was supported by a grant from the National Science Foundation.

CROSS REFERENCE TO RELATED APPLICATIONS

This is a division of our copending application Ser. No. 07/434,898, filed Nov. 13, 1989, now U.S. Pat. No. 5,041,195, issued Aug. 20, 1991, which is a continuation-in-part of U.S. application Ser. No. 07/272,783, filed Nov. 17, 1988, and now abandoned.

FIELD OF THE INVENTION

This invention relates to electrocatalysts. An aspect of this invention relates to an electrocatalytically active electrode which can be either a cathode or an anode but is preferably a cathode, particularly an air or oxygen cathode adapted for use in a cell having an alkaline electrolyte or a solid polymer electrolyte. Still another aspect of this invention relates to electrocatalysts which contain gold as the active catalytic metal (pure or in alloy form) but which are particularly well suited for use in an air or oxygen cathode. Still another aspect of this invention relates to metal/air cells, fuel cells, chlor-alkali production units, electrochemical caustic concentrators, and gas-sensing devices which utilize gold-containing electrocatalysts. Still another aspect of this invention relates to methods for making electrocatalyst materials and the products of those methods. This invention also relates to methods for sensing the content of a particular gas in a gas stream and methods for reducing oxygen or peroxide ion to water or hydroxide ion by electrochemical means.

DESCRIPTION OF THE PRIOR ART

Electrocatalytic materials containing gold (either as the pure metal or in alloys with other metals) have been investigated extensively, particularly since the beginnings of the development of modern fuel cell and metal-/air cell technology. Gold as an electrocatalytic metal has been of interest for a variety of reasons. First, gold is not easily poisoned by carbon monoxide, whereas platinum and some of the other Group VIII metals with a strong affinity for carbonyl groups may be subject to a significant amount of CO poisoning. When pure hydrogen is the fuel fed to the anode of a fuel cell, the sensitivity of certain Group VIII metals toward carbon monoxide is of no consequence, but oftentimes, it is desirable, particularly from a cost standpoint, to obtain hydrogen by reformation of hydrocarbons, in which case it is difficult to remove completely all traces of CO from the resulting hydrogen fuel. Alloys of gold and Group VIII metals have received a considerable amount of attention in the patent literature as candidates for the active component of electrocatalytic anodes useful in acid fuel cells, particularly of the phosphoric acid type.

Another major area of interest with respect to gold electrocatalysts relates to their use in alkaline cells, due to the outstanding stability (corrosion resistance and/or low solubility) of metallic gold in alkaline media. Even Group VIII noble metals such as platinum can be somewhat unstable or even unreliable in alkaline cells. Unfortunately, however, it is difficult, utilizing other metallic ingredients, to obtain an electrocatalyst for the reduction of oxygen which has activity comparable to known air or oxygen platinum-catalyzed cathodes. In addition to being somewhat less active than these other metallic ingredients, gold seems to have a tendency to catalyze oxygen reduction only as far as $H_2O_2$ or the peroxide ion. This partial reduction of oxygen results in a two-electron change. Particularly when maximum current density or current efficiency is the goal, complete reduction of oxygen to water or hydroxide (a four-electron change) is vastly preferable to the partial reduction reaction.

There are other attractive features of gold-containing electrocatalysts which could be very important if the drawbacks of these catalysts could be eliminated. For example, gold is not a strategic metal (unlike platinum). Moreover, despite large increase in the price of gold since the 1960's, gold is still less expensive than many of the noble metals of Group VIII of the Periodic Table (e.g. platinum).

In the scientific literature, theoretical studies report that crystallographic considerations may be relevant to both the low activity of gold electrocatalysts (in certain contexts, particularly as cathodes in alkaline cells) and the apparent inability of gold catalysts to provide complete reduction of oxygen to water or hydroxide. These theoretical considerations have great practical significance in electrochemical cells utilizing gold or gold alloys supported on carbon. Carbon is itself an electrocatalyst and also has a tendency to catalyze the partial electrochemical reduction of oxygen to $H_2O_2$ or peroxide ion, particularly in alkaline electrolytes. Unless some other catalytic component is present to reduce the peroxide or peroxide ion to hydroxide or water, there may be little if any cooperation between the metallic component and any exposed carbon particles with respect to the goal of a four-electron change through complete reduction of oxygen.

Researchers have suggested that there may be distinctions in electrochemical activity between the various faces (111), (110), and (100) of gold crystals. Data obtained in experimental studies indicate that the (100) face may have superior activity. On the other hand, the literature seems to be devoid of any realistic plan for maximizing exposure of (100) faces in any commercially practical type of active electrode. For example, if the active electrode surface contains polycrystalline gold, random orientation of crystal faces is a virtual certainty. "Growing" microscopic "crops" of gold crystals is also impractical, particularly as compared to known in-situ reduction techniques, whereby a known type of support material can be impregnated with a gold salt or the like, and the gold salt can then be reduced in situ to metallic gold particles. In the existing technology, however, the latter approach has produced supported gold electrocatalysts which are modest at best in their electrocatalytic activity and which do not seem to provide the highly desirable four-electron change resulting from the complete reduction of oxygen to water or hydroxide. Accordingly, it must be assumed that the modern techniques for impregnating carbon with gold compounds followed by in-situ reduction of the gold compounds to metallic gold also produce a random arrangement of gold crystals in which the number of exposed (100) faces is purely statistical and is not necessarily in the majority. Alternatively these techniques may have a tendency to produce metallic gold particles which are larger than about 5 nanometers (50Å) in size. (Because the fundamental studies reported in the scientific literature have not dealt specifically with commercially practical forms of supported gold, it has generally been necessary to speculate regarding the reasons for the inferior characteristics of known forms of gold electrocatalysts, however.)

Accordingly, this invention contemplates a new approach to the development of gold-containing electrocatalysts, whereby the deficiencies of known gold-containing electrocatalysts can be ameliorated or eliminated without necessarily alloying the gold (although subsequent alloying with other metals is within the scope of this invention) and without coating or otherwise treating the metallic gold with other metals.

SUMMARY OF THE INVENTION

It has now been discovered that a gold-containing electrocatalyst can be obtained from a particulate active carbon or other conductive support material and a gold compound reduced to metallic gold in-situ after the gold compound has been dispersed generally uniformly throughout the carbon support material. Available evidence seems to indicate that the resulting gold particles are monocrystalline, have an average size smaller than 5 nanometers (measured by transmission electron microscopy) and behave as if they had exposed (100) faces. Based upon the very small size and behavior of the supported monocrystals of gold, we have concluded that the very small size of these supported gold crystals somehow favors the exposure of (100) faces (or their functional equivalent) and hence these faces are available to catalyze the reduction of oxygen to water or hydroxide and/or the reduction of peroxide ion to water or hydroxide. For example, the polarization behavior of the electrocatalytic material exhibits superior oxygen reduction capability at current densities well beyond 500 mA/cm$^2$, e.g. out to 1000 mA/cm$^2$. The iR-corrected oxygen reduction performance is, for example, >0.7 volt vs. RHE (a reversible hydrogen electrode reference) at 200 mA/cm$^2$.

The support material is, for example, a carbon black having a surface area, by the B.E.T. method, of about 50 to about 2000 m$^2$/g. A gold compound comprising cations (e.g. Au$^{+3}$) or anions (e.g. AuCl$^-_4$) containing one or more gold atoms is dissolved in a suitable polar solvent (preferably a mixture comprising water and a polar organic solvent, which mixture is capable of wetting completely the surfaces of the carbon particles), and a mass of the active carbon is impregnated with this solution to the extent of 0.1–20% by weight Au, based on the weight of carbon plus gold. The impregnation may be done in a single-step procedure or in a stepwise fashion. After the polar solvent has been evaporated, the gold compound is reduced, preferably at moderate temperatures and preferably with a reducing gas, to essentially crystalline elemental gold particles having an average particle size, measured by transmission electron microscopy (TEM) of <5 nanometers (<50 Ångstrom units) These small crystalline elemental gold particles are primary particles; that is, they are spatially well dispersed on the support material and hence are unagglomerated. Even if it be possible to agglomerate these tiny particles in situ (e.g. by partial sintering), the individual particles would still be characterizable by TEM and thus would not have completely lost their primary particle size characteristics and would have the same or similarly large surface area. The non-agglomerated primary particles have a surface area >50 m$^2$/g (e.g. 100 m$^2$/g or more). Because of the very small size of these primary particles, it is believed that they are necessarily monocrystalline rather than polycrystalline.

Although carbon support materials are preferred from the standpoint of availability, high surface area, and electrical conductivity, these materials are subject to the corrosive action of acid or alkaline electrolytes in an electrochemical environment. Fluorination and graphitization of carbon have been suggested as means for increasing corrosion resistance; however, it has been found to be much more difficult to fabricate an efficient oxygen cathode structure from graphitized carbon, and some functionality (e.g. oxygen-containing functional groups such as —OH, —COOH, —CHO, etc.) on the surface of the carbon particles is ordinarily preferred over graphitized carbon. Fluorination has indeed been found to increase corrosion resistance through formation of C(F)$_x$ groups.

Another approach to the problem of corrosion resistance has been utilized in the prior art and has received some notice in the patent literature. Particularly in the past ten to twenty years, a significant amount of development has taken place in the field of conductive and semi-conductive, refractory or high-melting compounds (e.g. oxides) of metals such as copper, lead, bismuth, rare earth metals, noble metals, transition metals, including so-called valve metals (such as titanium), alone or in combination with each other or with alkaline earth metals, minerals such as perovskite (a titanate), and the like. Many of these metal compounds are ceramics or are referred to as ceramics since they are typically produced by the ceramics industry and are subject to firing at some stage of their manufacture or have melting points in the temperature range typically used in ceramic chemistry, e.g. >500° C. (Traditionally, "ceramics" are made from clay or other naturally-occuring silicates, but modern electrically conductive or semi-conductive "ceramics" are typically inorganic oxides which may or may not have a natural mineral counterpart or analog such as perovskite.) These inorganic compounds can be prepared in particulate form and can have a high surface area, e.g. >50 m$^2$/g by the B.E.T. method. It has been found, for example, that ruthenium oxide (RuO$^2$) can itself serve as an electrocatalyst when applied to a conducting substrate. See, for example, U.S. Pat. No. 3,798,063 (Decraene), issued Mar. 19, 1974, reissued as Re. 29,419 on Sept. 27, 1977. Non-agglomerated particulate pyrochlore compounds such as lead-rich and bismuth-rich ruthenates and iridates can have high surface area (e.g. >50 g/m$^2$) and can be used as electrocatalysts in oxygen electrodes (e.g. oxygen cathodes) in electrochemical devices. See U.S. Pat. No. 4,440,670 (Horowitz et al), issued Apr. 3, 1984.

The particularly preferred electrically conductive inorganic metal oxides used as support material in this invention are particulate titanium compounds, including the suboxides of titanium (TiOx, where x is a fractional number less than 2.0, e.g. Ti$_y$O$_{2y-1}$, where y is typically 4 or 5, such as "EBONEX" (trademark of Ebonex Technologies, Inc.). As is known in the art, the surface area of these materials can be made comparable to that of conventional activated carbons, i.e. at least 50 m$^2$/g by the B.E.T. method. B.E.T. values in excess of 2,000 m$^2$/g are difficult to achieve and in any event are not required for good performance. The electrically conductive inorganic titanates, oxides (including suboxides) etc. tend to be more hydrophilic than most forms of carbon and hence are easier to wet out during impregnation with solutions of gold compounds and during operation as a support material in an electrochemical cell. The degree of hydrophilicity in such operation can be adjusted in a known manner with hydrophobic polymers.

An electrocatalyst of this invention can be formed into an active layer deposited or otherwise superposed upon a backing layer such as carbon cloth or paper, fine wire mesh, or other porous laminate in a manner known in the porous gas-diffusion electrode (GDE) preparation art. The porous backing layer can be rendered hydrophobic on the surface opposite to the electrocatalytic surface, as is typically done when manufacturing gas-diffusion electrodes (GDE's). The electrocatalytic surface of the resulting electrode can contain from 0.1 to 5 milligrams of elemental gold per geometric square centimeter of electrocatalytically active electrode surface. More typically, the amount of elemental gold will be in the range of 0.1 to 2 mg/cm$^2$.

The electrode described above provides significant advantages when used as an air or oxygen cathode in an alkaline fuel cell, a metal/air or metal/oxygen battery, an air or oxygen cathode for reducing the power requirements of a chlor-alkali cell, any other type of cell in which oxygen or peroxide or peroxide ion is to be reduced to hydroxide or water, a gas sensor, an electrochemical caustic concentrator, or the like. Electrodes of this invention function well with solid polymer electrolytes as well as liquid electrolytes.

Less preferably, an electrode of this invention can be used as an anode in a cell containing an acid electrolyte. Because of the gold content of such anodes, they are less sensitive to carbonyl and carbon monoxide poisoning than platinum-containing GDE anodes.

BRIEF DESCRIPTION OF THE DRAWING

The sole figure of the Drawing illustrates three graphical plots of polarization curves described in instant Example 2.

DETAILED DESCRIPTION

Although the electrodes of this invention can be utilized as anodes in acid fuel cells (e.g. the conventional H$_2$/O$_2$ phosphoric acid fuel cells, which are typically operated at temperatures in the range of 200°–300° C., or in cells directly utilizing organic fuels such as alcohols, alkenes, etc.), the primary focus of this description will relate to air or oxygen GDE cathodes for alkaline cells operated at moderate temperatures (below about 150° C., and typically below 100° C.), e.g. at room temperature (15°–30° C.) in gas sensors or 70°–80° C. in electrochemical cells. With respect to the various types of alkaline cells utilizing air or oxygen cathodes described above, the electrocatalytic selectivity of primary, monocrystalline elemental gold particles obtained in accordance with the teachings of this invention is particularly significant. Although this invention is not bound by any theory, considerable evidence indicates that the very small size of these gold particles, obtained by reduction in situ on the carbon support material, somehow provides the benefits of Au(100) crystal faces (or the functional equivalent of these crystal faces) and suppresses the effects of Au(111) and Au(110) faces.

It is considered very surprising that the effects provided by the in-situ reduced gold monocrystals formed in accordance with this invention are not analogous to a summation of effects from a purely random or statistical distribution of gold crystal faces. A skilled physical chemist might expect some degree of order or orientation of solute in a solution, particularly a concentrated solution, but not enough order to provide any particular orientation of single crystals formed as the solvent evaporates or to provide order in the orientation of crystal faces after the dried solute undergoes a chemical reaction. It is therefore difficult to explain the results obtained by this invention, but certain aspects of the process of this invention may have relevance to this surprising result. (Again, it should be noted that this invention is not bound by any theory.) For example, it is possible that the particulate support material may provide some degree of order. However, the selection of support material appears to have only minor effects upon the performance of an air or oxygen cathode of this invention. Even graphitic carbon can be utilized as a support material if the electrode structure is carefully and fully optimized. Accordingly, it is presently theorized that the very small size and/or high degree of order in the orientation of the gold monocrystals is aided by the support material when: (a) a volatile, polar, non-oxidizing, preferably neutral solvent is used as the gold compound-containing impregnation medium (e.g. water/alcohol mixtures for carbon support materials or, for more hydrophilic inorganic metal- and oxygen-containing compounds, other aqueous, preferably neutral or substantially neutral media including water itself), (b) the impregnation medium is evaporated off so as to deposit well-dispersed, extremely small nucleating sites comprising the unreduced gold compound (e.g. HAuCl$_4$, a gold halide, a gold oxide, or the like) on the surface of the support particles, and (c) the extremely small particles of reducible gold compound are then reduced to metallic gold monocrystals at moderate temperatures, e.g. below about 350° C., more preferably below 100° C.

Elevated temperatures are preferably avoided throughout the process of this invention. The impregnation step can take place at room temperature. The removal of the solvent is preferably carried out with the aid of vacuum at relatively low temperatures. In the reduction step, temperatures above 100° C. have been found to be unnecessary; indeed, room temperature is suitable for either electrochemical or chemical reduction of gold-containing salts or acids to elemental gold. Thus, sintering of elemental gold particles is generally avoided, and, if any sintering is done, the size characteristics of the primary elemental gold particles are not entirely lost, as explained previously.

Thus, the method used to make an electrocatalyst of this invention is of great importance, and known techniques are not likely to meet the criteria of this invention.

For example, one known technique which appears to be poorly suited to this invention is the formation of a colloidal suspension of gold after Turkevich, "Colloidal Gold, part I. Historical and Preperative Aspects, Morphology and Structure," Gold Bull., 18, 86 (1985) and Part II, "Color, Coagulation, Adhesion, Alloying and Catalytic Properties," Gold Bull., 18, 125 (1985). As noted previously, it is presently believed that there may be some correlation between the small size of the primary monocrystalline gold particles utilized in this invention and the observed behavior of these tiny particles, which behavior resembles that of Au(100) crystal faces. The method of Turkavich produces particles which by TEM appear to average about 20 nanometers (200 Ångstrom units) in size, almost an order of magnitude too large for the purposes of this invention. Similarly, known processes for precipitating gold "blacks" from solution pose problems in this invention, not only because the particles may be too large, but also because of the relatively low activity of polycrystalline gold. In a polycrystalline gold particle, there can be grain boundaries between crystals oriented in different directions or planes. Such polycrystalline arrangements increase rather than decrease the randomness of crystal face orientation, regardless of what support these particles may be deposited upon.

Another factor considered to be of importance is the degree of wetting of the particulate active carbon material used as the support for the gold. As is known in the art, impregnation of a mass of active carbon with a solution of a gold salt or of chlorauric acid can be achieved rather efficiently with a polar solvent mixture comprising water and an organic solvent such as methanol. Surprisingly, however, a methanol/water mixture does not appear to be the optimum selection for the impregnation step in the process of this invention. The optimum choice appears to be a water/isopropyl alcohol mixture.

According to the scientific literature, there is a relationship between particle size of the catalytic metal and the loading level of the metal on carbon. See, for example, Ehrburger, "Dispersion of Small Particles on Carbon Surfaces" Advances in Colloid and Interface Science, 21, 275-302. Since small elemental gold particles appear to be particularly important in this invention to insure monocrystalline character and possibly also the desired orientation or behavior of the particles, loadings of gold on carbon >50 weight-%, e.g. 20 weight-% (based on the weight of gold plus carbon, i.e. based upon the weight of the resulting active layer which is deposited on the backing layer) are considered highly undesirable. Excessive particle size may also be encountered with loadings above 15 weight-%, and the preferred loading ranges from 0.1 to about 10% by weight (same basis). Throughout the 0.1-10 weight-% range of loadings of gold on carbon, primary elemental gold monocrystalline particles having an average size of <50 Ångstrom units, more typically less than 40 Ångstrom units are observed in TEM studies. Much smaller particles (greater than 5 but less than about 25 or 30 Ångstrom units) are easily achieved in practice, particularly within the range of 10-30 Ångstroms (1-3 nm), according to TEM studies of the gold-on-carbon material itself and the active layer after it has been introduced into an electrode structure. Some improvement in particle size can be obtained when the impregnation is done in a stepwise fashion, although stepwise impregnation is not critical to the results achieved by this invention.

Oxygen reduction has been more extensively studied on platinum in acid media than on gold in alkaline media. Analogizing of the results of the platinum studies to gold is presently believed to be rather speculative; accordingly, studies concerned primarily with gold in general, monocrystals of gold, and carbon support materials are believed to be more reliable indicators of the importance of the parameters selected in the process of this invention. Some general guidelines can be obtained by consulting crystallographic theory, however.

Assuming a cubo-octahedral structure for face-centered cubic (f.c.c.) metals, the ratio of (100) and (111) crystal faces and edges and vertices has been shown to vary with particle size. See R. Van Hardeveld et al, Surface Science 4, 396 (1966). Additionally, the lattice parameter has been shown to decrease with decreasing particle size for several metals by C.W. Mays et al, Surface Science 12, 134 (1968). Of interest here is that the lattice constant of gold has been shown to decrease as the particle size is decreased to approximately 30 Angstroms (3 nm).

E. Yeager, "Mechanisms of Electrochemical Reaction on Non-Metallic Surfaces," in *Electrocatalysis on Non-Metallic Surfaces,* Franklin (ed.), NBS Special Publication 455 (1975) has proposed models for adsorbed oxygen and corresponding reaction pathways for oxygen electro-reduction. Yeager contended that a single site "end on" Pauling adsorption or "side on" Griffith adsorption would tend to lead to a peroxide product, whereas a dual site "bridge" adsorption would lead to hydroxide as the product. More recently, J. McIntyre et al, "Electrochemistry At Single-Crystal Metal Electrodes. Electrocatalytic Effects of Surface Atomic Structure, Defects and Ad-Atoms on Oxygen Reduction," in the *Electrochemistry and Physics of Electrocatalysis,* Weaver et al (eds.), The Electro-Chemical Society, PV 84-12, Pennington, New Jersey, and R. Adzic et al, J. Electroanal. Chem. 138, 492 (1982) independently reported differences between the oxygen reduction reaction on different single crystal gold surfaces in alkaline media. Both research groups speculated that oxygen reduction at relatively low overvoltages (i.e. in that potential range of interest for operation of an oxygen or air cathode in various electrochemical devices including alkaline fuel cells) occurred via a four-electron process on the Au (100) surface and a two-electron process on the Au (111) and (110) surfaces at the lower overpotentials. These workers used the rotating disk electrode technique which is considered to render speculative the relative roles of hydrogen peroxide and water in the proposed mechanisms. Using a rotating ring-disc electrode technique, studies conducted in connection with the present invention provided concrete evidence of the behavior of oxygen and peroxide electro-reduction kinetics on polycrystalline and single crystal (111), (110), and (100) gold surfaces. These more definitive studies are believed to demonstrate that the gold (100) surface exhibits unique and very high catalytic activity and selectivity of oxygen reduction (via four-electron change to hydroxide or water) relative to the other crystal surfaces. Because the (100) surface appears to be capable of facilitating complete reduction to water or hydroxide ion, it follows that any peroxide ion intermediate produced, for example, by other catalytic surfaces which may be present (e.g. exposed carbon surfaces) can be further reduced to water or hydroxide. Moreover, hydrogen peroxide or peroxide salts, if used as oxidants, would be reducible to water or hydroxide by Au (100).

Even if there were errors in the literature studies or in the studies connected in accordance with this invention, the fact remains that air or oxygen cathodes prepared in accordance with this invention exhibit surprisingly superior performance when compared to cathodes prepared from bulk gold, polycrystalline gold, colloidal gold, gold-on-carbon wherein the gold has been obtained from a gold compound decomposed at elevated temperatures, and gold-on-carbon obtained by reducing the gold compounds at elevated temperatures. The difference in results between a gold-containing cathode of this invention and the other cathodes described above may be rationalized on the basis of structure-sensitivity of electro-reduction reactions (e.g. $O_2$ to $OH-$) on gold. In any event, operating voltage vs. current density plots demonstrate an unusually high level of oxygen reduction in potential (voltage) regions which lie high within the operating range of alkaline fuel cells and other cells utilizing air cathodes and alkaline electroyte media or solid polymer electrolytes. This highly desirable potential region can be characterized either with reference to standard half-cell potentials or with respect to the potentials provided by complete operating cells ($E_{cell}$). In half-cell studies, wherein the reference electrode is a hydrogen reference or the like, the observed potentials are very similar to the $E_{cell}$ in an operating $H_2/O_2$ fuel cell, the polarization at the anode being relatively slight, (e.g. on the order of 50 millivolts). The standard potentials reported in the literature establish that elemental hydrogen is not produced at an air or oxygen cathode until the potential is strongly negative with respect to a hydrogen reference. The operating potential of cathodes and cells constructed in accordance with this invention is well "below" (more positive than) this strongly negative value and can, if desired, be kept positive with respect to a hydrogen reference (0.00 v.). According to strictly thermodynamic considerations, the preferred potential region should be above 0.4 volts. When kinetic considerations, polarization, etc. are also taken into account, this value is normally increased by as much as 0.1 or 0.2 volts, so that the optimum operating range for the four-electron change (and/or for the reduction of peroxide ion) is above about 0.6 volts. Theoretically, a cell could be operated at potentials as high as 1.2 v., but a more typical upper end of the range would be 0.9 v. Because cells (e.g. alkaline fuel cells) constructed in accordance with this invention can be conveniently and effectively operated in the 0.6–0.9 v. range, it is believed that the two-electron reduction (oxygen to peroxide), which should occur in the more cathodic region of 0.1–0.6 v. is greatly overshadowed on the gold surfaces during cell operation, and peroxide intermediates which are formed (e.g. on exposed support material) can be further reduced to water and/or hydroxide.

Various preferred aspects of this invention will now be discussed in detail.

DEFINITIONS

Throughout the specification and claims of this application, the following terms have the indicated meanings.

"Monocrystalline gold primary particles" refers to particles of elemental (metallic) gold wherein each particle is a single crystal with no grain boundaries. These single-crystal particles are, in this invention, normally smaller than 5 nanometers (50 angstrom units) in size as "primary" particles. That is, even if a plurality of the particles is loosely agglomerated in some fashion into a larger particle, the primary particles which make up the larger particles still retain at least some of their individual dimensions and still behave much like individual particles. Because these particles are so small, the word "crystalline" or "monocrystalline" has a special meaning. A 5 nanometer particle of gold occupies only enough volume for a very few repetitions of a crystal pattern (i.e. repetitions of one unit of the lattice). For example, if there were, say, a minimum of 14 atoms needed for a single unit of a crystal lattice (the sum total of the points of intersection of any three sets of equidistant parallel planes), even this single unit could occupy a space as large as about 10 angstrom units (1 nm) in diameter. It is therefore difficult to say with scientific certainty that the "monocrystalline" gold primary particles of this invention have exactly the same crystalline character as macroscopic crystals. For example, it might be impossible to cleave a 1.5-nanometer (1.5 nm or 15 Å) gold "monocrystal" along the (110) or (111) plane. On the other hand, a small number of gold atoms could be arranged in an ordered or semi-ordered fashion which would resemble and be the practical equivalent of any of the normally available faces of a macroscopic gold crystal. (Theoretically, a single atom of gold, which has a diameter of slightly less than 0.3 nm, i.e. almost 3 angstrom units, has no crystalline character whatever, but as few as four or five atoms of gold could be organized into the functional equivalent of a crystal face having a two-dimensional width of, say, 9 or 10 angstrom units.) Thus, the sub-colloidal gold particles of this invention, when described as "monocrystalline", should be understood to be either true single crystals of sub-colloidal size with complete lattices (including repetitions) or the functional equivalent of single crystals having the functional equivalent of crystal faces, even though they may be too small to possess a plurality of three-dimensional repititions of the atomic pattern of a complete unit of a lattice and/or are too small to be cleaved in the same manner as a macroscopic monocrystal.

"Crystal faces", including the "(100) crystal face", the "(110) crystal face", the "(111) crystal face", etc. should be understood to have the meanings given to these terms in the art of crystallography, but should also be understood to refer to the ordered arrangement of a very few atoms of metal (especially gold) in a manner which serves as the functional equivalent of a crystal face, e.g. a (100) face. Thus, even though a primary gold particle 1 or 2 nanometers in size probably cannot be cleaved along, say, the (111) plane in the same manner as a macroscopic crystal, these very tiny particles are believed to be capable of exposing the two-dimensional equivalent of a crystal face, particularly a (100) face, when formed in situ on carbon in accordance with the teachings of this invention—even if there are not enough gold atoms in the "monocrystal" for a three-dimensional repitition of the atomic pattern of a gold crystal lattice (or even a single unit of the lattice).

"The B.E.T. method" refers to the Brunauer-Emmett-Teller method of determining surface area.

The term "carbon black" is used as defined in U.S. Pat. No. 4,440,617 (Solomon), issued Apr. 3, 1984.

The term "electrolyte" refers to a single electrolyte or to anolyte/catholyte systems wherein a membrane divides the electrolyte space into two or more compartments.

THE SUPPORT MATERIALS

Suitable carbon support materials comprise active carbon or carbon black, i.e. carbon powder which is in a very finely divided state. When measured by the B.E.T. method, commercially available carbon black powders useful in this invention have a surface area of at least 50 $m^2/g$. Such powders include furnace blacks, lamp blacks, acetylene blacks, channel blacks, and thermal blacks, furnace blacks having a B.E.T. surface area greater than about 200 $m^2/g$, e.g. >600 $m^2/g$ being preferred. The particle sizes of these active carbon materials can range from about 5 to as much as about 1000 nanometers, but are preferably smaller than about 300 nanometers in average size.

The commercially available carbon blacks having a B.E.T. surface area of 50 to 300 m$^2$/g can be steam activated to enhance their surface area and thereby bring the B.E.T. value up to at least 600 m$^2$/g.

The surface characteristics of carbon blacks can vary. Some of these blacks have surface functionality, e.g. surface carboxyl groups (and other types of oxygen content) or fluorine-containing groups. Physico-chemical characteristics and ash content can also vary. Moreover, carbon blacks can be graphitized (whereby the carbon black powders acquire some of the structural characteristics of graphite) or graphitized and then treated to restore or enhance surface functionality.

The particularly preferred commercially available carbon support materials include BLACK PEARLS (trade designation), VULCAN (trade designation), and KETJENBLACK EC 300J (trade designation of Akzo Chemie Americo of Burt, New York, U.S.A.). The available KETJENBLACK materials are oil furnace blacks having a B.E.T. surface area ranging from about 900 to about 1000 m$^2$/g, and EC 300J in particular appears to have a surface area of 950 m$^2$/g. KETJENBLACK EC 300J contains a large fraction of mesophase carbon and hence has regions of long range order. These regions may make the carbon more corrosion resistant (which is important in cathode applications) and may provide some assistance in orienting the highly dispersed gold particles.

According to U.S. Pat. No. 4,461,814 (Klinedienst), issued Jul. 24, 1984, KETJENBLACK oil furnace blacks have both high surface area (>900 m$^2$/g) and high dibutyl phthalate (DBP) absorption numbers. Klinedienst discloses that when the DBP absorption is determined by ASTM test D-2414-70, the absorption number should preferably be above 125 cm$^3$ per 100 g of carbon black (e.g. >230 cm$^3$/100 g) and the surface area should be >250 m$^2$/g, in order to provide a carbon black cathode current collector with optimum operating characteristics. The DBP absorption number for KETJENBLACK is reported by Klinedienst to be 340 cm$^3$/100 g. Acetylene blacks tend to have high DBP absorption numbers but low B.E.T. surface area. Conversely, Lurgi carbon blacks (from Lurgi Umwelt und Chemotechnik GmbH) can have extremely high B.E.T. surface area (>1200 m$^2$/g) accompanied by a low DBP absorption number (<100). The "CSX" carbon blacks (available from Cabot Corporation of Billerica, Massachusetts, U.S.A.) are also reported to have high B.E.T. surface areas and high DBP absorption numbers.

As noted previously, the preferred particulate, electrically conductive, high-melting (or infusible) metal- and oxygen-containing compounds contemplated as support materials also have a B.E.T. surface area of at least 50 m$^2$/g and contain titanium, e.g. conductive titanium suboxides of the formula TiO$_x$, where $0 < x < 2$, and x is a fractional number. These support materials preferably have a melting or sintering temperature above about 300° C.

MONOCRYSTALLINE GOLD AND METHODS OF FORMING SUPPORTED GOLD

An important aspect of this invention is that the metallic gold which is formed by reduction in situ on the active carbon material be essentially monocrystalline rather than polycrystalline. Single crystals are apparently easier to orient such that (100) crystal face behavior is obtained. Achieving this behavior is apparently also facillitated by forming monocrystalline gold particles of very small size, e.g. with average particle sizes in the range of 10 to 50 Ångstrom units (1 to 5 nm), preferably 10 to 30 Ångstroms. Since several atoms are theoretically required for one unit (no repetitions) of a crystal lattice, it is likely that a particle of gold which is about 1 nm (10 Ångstrom units) in diameter is at or near the lower limit of size for a single gold crystal. (The atomic radius of gold is about 1.4 Ångstrom units.) Gold particles of such incredibly small size are difficult to characterize in classical crystallographic terms, but the standard terms for crystal faces are nevertheless used in this description, as explained previously. The justification for this use of terminology is that the tiny particles of gold on carbon, when prepared in accordance with this invention, exhibit electrochemical behavior substantially like single gold crystals with their (100) crystal faces exposed. Thus, the behavior of highly dispersed gold-on-carbon supported catalysts does not resemble bulk gold, colloidal gold, polycrystalline gold, or any other larger, less highly dispersed gold particles on carbon.

Several factors can affect the metal particle dispersion of metallic electrocatalysts supported on carbon black. These factors are believed to include: first, the loading of the metal particles on the support, which can be expressed in terms of weight percent, i.e. parts by weight of metal per 100 parts metal+support. After the supported metal has been deposited on a backing layer and fashioned into an active (high surface area) electrode, the loading can also be expressed in terms of milligrams of metal per geometric square centimeter of electrode surface (mg/cm$^2$). A second factor is the surface functionality of the support material. If the support material is graphitized in an inert atmosphere at 2000 to 3000° C., and too much surface functionality is lost, there are known chemical techniques for restoring or enhancing surface functionality (e.g. treatment with oxidizing or fluorinating chemicals). Fluorination is known to be effective in reducing oxidative corrosion of carbon in air and oxygen cathodes.

A third factor is the surface area and/or absorptive properties of the support material. B.E.T. data are important here, and DBP absorption numbers have also been shown to be of significance.

A fourth factor, which may be the most important in this invention relates to various aspects of the technique for depositing the metal particles on the support. Although this invention is not bound by any theory, it is believed to be important that (a) the reducible gold compound is impregnated into the support material with a non-oxidizing polar solvent having outstanding wetting characteristics vis-a-vis the support, (b) the solvent is gently evaporated at moderate temperatures, and (c) the resulting dry or substantially dry material is subjected to chemical reduction with a reducing gas such as substantially dry hydrogen under moderate temperature conditions (e.g. room temperature). It is not desirable to reduce the gold compound in situ on the carbon black while the impregnated carbon is still in contact with the impregnation medium. It is also not desirable to dissolve gold in strongly acid (pH<1) or strongly basic (pH>12) or acidic oxidizing media such as aqua regia and use the aqua regia as the impregnation medium. (Aqua regia can, on the other hand, be used to make soluble gold compounds which are subsequently dissolved in a non-oxidizing polar solvent.) Aqua regia is more difficult to evaporate than water or water/alcohol mixtures; it may have corrosive effects on oxidizable support materials; it lacks the proper hydrophobe/hydrophile balance for impregnation of carbon support materials; and its residues may interfere with chemical reductions.

Accordingly, in this invention, it is difficult to utilize reducing agents which normally function only in liquid media (e.g. metallic hydride solutions); however, reducing gases such as flowing hydrogen (preferably dry hydrogen) are fully effective in this invention at moderate temperatures and tend to produce—at these temperatures—monocrystalline gold particles of very small size supported on the carbon black. The use of a protective colloid to prevent undesired gold or gold compound particle growth phenomena is not necessary in this invention; accordingly, the impregnation medium is relatively simple and can if desired, consist essentially of the polar solvent.

The formation of these extremely small supported gold particles is also believed to involve relationships between nucleation and growth phenomena. The nucleation sites should preferably be dispersed as much as possible, and crystal growth should be minimized. It is theorized that gentle removal of the polar solvent followed by reduction of the supported gold compound in a substantially dry (and possibly well-oriented) state at moderate temperatures may help disperse nucleation sites, minimize crystal growth, ensure the individuality of primary particles, and encourage or preserve non-random monocrystal orientation in situ on the carbon black. Stepwise impregnation is a technique which can be used to build up gold loadings gradually (e.g. in stages of 1–3 wt-% each, based on the weight of carbon+gold), thereby minimizing or further minimizing crystal growth.

Although gold loadings, based on the weight of the active layer of electrochemical catalyst material, can range from 0.1 to 20 weight-%, loadings in excess of 15 weight-% are not absolutely necessary, and excellent results have been obtained with loadings in the range of 1 to 10, more typically 2–10, weight-%. When the gold-on-carbon material has been deposited or superposed on a backing and fashioned into an electrode, the gold content of the active surface will typically be less than 2 mg per geometric $cm^2$ of active surface. A gold content at or below 1.0 mg/$cm^2$ is readily achieved in practice, and such electrodes made according to this invention provide adequate current densities and useful voltage-vs.-current density or polarization curves. Some loss of performance may be observed at 0.1–0.3 mg/$cm^2$ gold content but relatively good performance is seen at >0.3 mg/$cm^2$.

The metallic component in the electrocatalytic material of this invention can include other metals besides gold, e.g. other Group I-B metals and metals of Groups VII, IVB, VB, VI-B, VII-B, etc., particularly nickel, cobalt, and the second and third triads of Group VIII of the Periodic Table. However, any metal which would disrupt the non-random and/or (100) crystal face orientation of the supported gold particles is preferably avoided. It is also preferred to avoid metals which would detract from the excellent corrosion resistance of gold in aqueous media (particularly alkaline aqueous media). Disruption of the crystal face orientation can be minimized by forming the gold-on-carbon particles first and subsequently depositing a second metal (rather than co-depositing a gold compound and a second metallic compound on the carbon). The amount of gold in the resulting co-deposited combination of metals is preferably above 50 atomic-%, more preferably above about 65 or 70 atomic-%. There is no upper limit on the gold content of these combinations of metals, since 100% gold is preferred for many applications of the technology of this invention, particularly when the electrocatalytic material is utilized in a cathode for an alkaline cell. Combinations of gold with other metals (e.g. Group VIII noble metals) are appropriate when an H-H or C-H bond stretching capability is needed, e.g. for electrochemical oxidations or hydrogenations, as in the case of anodes for acid cells. Thus, combinations containing only 5 or 10% of the second or additional metal or metals are fully operative. The additional metals are preferably also obtained through reduction of cations or anions containing these metals by flowing dry hydrogen over the composition of gold and the subsequent metallic compound deposit (on carbon), typically at room temperature.

Reducible gold compounds used in the method of this invention are preferably soluble in polar solvents such as water, alcohols, and water-alcohol mixtures. Chlorauric acid ($HAuCl_4$) meets this criterion; moreover, $HAuCl_4$ can be made on a commercial scale by dissolving metallic gold in a mixture of nitric and hydrochloric acids. Gold chlorides and bromides (particularly $AuCl_3$) are also easily reducible and can be dissolved in appropriate impregnation media. Gold cyanide is readily soluble. Gold oxides and hydroxides can be dissolved in acid media.

The preferred impregnation medium comprises a mixture of 2–80 volume-% water in 20–98 volume-% of a lower aliphatic alcohol. The best results appear to be obtained when isopropyl alcohol (2-propanol) is diluted by 5 to 50 volume-% with water, so that the volume ratio ranges from 1:1 up to almost 20:1, alcohol:water.

Accordingly, in the preparative method of this invention, a carbon-supported gold-containing electrocatalytic material is most preferably made by:

(a) impregnating the carbon black with an isopropyl alcohol:water solution of chlorauric acid or the like, resulting in a mixture of carbon particles and dissolved gold compound typically comprising about 1 to 15% by weight unreduced gold and about 85 to 99% by weight carbon black, (b) evaporating the alcohol:water solvent, preferably under vacuum at temperatures below 100° C. (e.g. in a rotary evaporator at or near room temperature, i.e. below 30° C.), and (c) collecting the chlorauric acid-impregnated carbon in a substantially dry state and subjecting it to substantially dry flowing hydrogen at or near room temperature.

When the support material comprises an inorganic oxide (including a suboxide of titanium), the isopropyl alcohol component of the chlorauric acid solution is less important.

If staged impregnations are used, the reduction of the gold compound (e.g. $HAuCl_4$) to metallic gold is carried out prior to the beginning of the next impregnation.

The resulting electrocatalytic material is then preparably coated onto a backing paper as is or after blending with hydrophobic polymer particles, e.g. particles of polytetrafluoroethylene (PTFE), polytrifluorochloroethylene, polyvinylidene fluoride, etc. The backing layer is preferably porous (e.g. carbon felt, carbon paper, etc.) and can be a laminate which includes a gas-permeable layer of PTFE or other hydrophobic polymer, preferably as the outermost layer which forms the "gas side" of a GDE (gas-diffusion electrode), i.e. the major surface opposite to the electrocatalytically active surface. The electrocatalytic surface (comprising the layer of gold-on-carbon) is designed for contact with a liquid or solid electrolyte. If desired, a corrosion-resistant metallic current collector (e.g. a wire mesh) can be included in the electrode structure, but porous carbon itself can serve as a current collector..

As is known in the art, such GDE designs can provided with suitable electrode attachments and structural elements, e.g. a lead suitable for use as an electrical connection, structural support members, etc. Like most conventional GDE's, a GDE of this invention usually has a hydrophobic face for receiving an oxidant gas (if it is a cathode) or a fuel (if it is a fuel cell anode) and an electrocatalytically active face for contacting the electrolyte and for providing a three-way interface between electrolyte, fuel or oxidant, and catalyst. Pore formers can be included in the backing layer, if desired.

The art of GDE fabrication is so fully developed at this time that further description of the fabrication techniques is believed to be superfluous.

ELECTROCHEMICAL CELLS

The electrocatalytic material of this invention and electrodes prepared from this material are useful in several different types of electrochemical cells, including electrolytic cells (to which a potential is applied from an outside power source), electricity-producing cells (fuel cells, metal/air cells, electrogenerative chemical synthesis cells) and so-called "voltameiotic" or depolarized cells. A voltameitoic cell is one in which the theoretical power requirements for the cell are greatly reduced through the use of fuel cell-like reactions occurring in the cell. For example, an electrolytic cell for the production of hydrogen by electrolysis has substantial power requirements due in part to the significant overvoltage encountered in the electrolytic decomposition of water. It is often the case in such cells that the desired product is hydrogen, and the oxygen produced at the anode is merely a byproduct, or, conversely, oxygen is the desired product and hydrogen is the byproduct. In these situations, one can take advantage of the half-cell potential produced by reducing an inexpensive or cost-free oxidant such as air at the cathode (or oxidizing an inexpensive fuel at the anode). Although the half-cell potential thus produced does not always eliminate power consumption by the cell, it may substantially reduce it.

Recent economic studies have shown that either the voltameiotic effect or the use of fuel cell technology could substantially reduce the power requirements of chlor-alkali production, resulting in meaningful cost reduction. With known technology, the most promising approach is to recover the hydrogen produced by the chlor-alkali production facility and convey it to a conventional fuel cell, where it is oxidized to produce significant amounts of electricity. (Hydrogen, while it is a valuable byproduct, is expensive to containerize, and shipping of the containerized hydrogen over very long distances is prohibitively expensive.) An air or oxygen cathode of this invention renders practical the other alternative; that is, if a highly active, commercially practical gold cathode of this invention is introduced into the chlor-alkali production system, the oxygen/hydroxide half-cell potential can be utilized to cut down the overall power requirements of a cell. In a chlor-alkali production unit, of this invention, chloride ion is still oxidized to chlorine gas at the anode, and hydroxide ion (hence NaOH or KOH) is still produced at the cathode, but it is no longer necessary to break down water molecules in order to obtain the hydroxide ion. The oxygen-containing gas (e.g. air) introduced to a GDE cathode of this invention is reduced to hydroxide ion in the four-electron change reaction described previously. As a result, the chlor-alkali unit can be operated in the voltage region 0.4–1.2 volts positive with respect to a hydrogen reference, more typically in the region of 0.6–0.9 volts. The substantial negative potential (negative with respect to a hydrogen electrode reference) is never even approached.

Another industrially-related application of the technology of this invention lies in the field of electrochemical concentration, more specifically electrogenerative caustic concentration. The expense of concentrating the caustic soda produced by a chlor-alkali production facility can be significant. In accordance with the principles of this invention, the concentration of NaOH or KOH in solution can be increased in a concentrating device (coupled to a chlor-alkali production unit) which is similar in design and concept to a hydrogen/oxygen fuel cell but is specially adapted to receive the relatively dilute alkali (about 30 weight-% concentration) obtainable directly from the catholyte of a chlor-alkali cell. The caustic concentrator cell is divided into anolyte and catholyte compartments by an ion-exchange membrane capable of releasing or passing sodium ions to the catholyte. The hydrogen-fueled anode of the cell can be conventional, but it is particularly desirable that the air or oxygen cathode be a cathode of this invention, so that $HO_2$ (peroxide ion) formation will be minimized or even totally avoided The alkali in the catholyte compartment can be concentrated to 40–50 weight-% by the concentrators, and as the hydrogen fuel one can use the hydrogen byproduct of chlor-alkali production. Thus, a caustic concentrator of this invention is operated essentially in the manner disclosed in Gelb, U.S. Pat. No. 4,647,351 (Mar. 3, 1987) the disclosure of which is incorporated herein by reference.

Electrodes of this invention are particularly useful as cathodes in alkaline fuel cells and metal/air cells. One can also adapt an electrode of this invention for use as an anode in a conventional acid fuel cell, e.g. a phosphoric acid cell operated at 200°–300° C. Because the electrocatalytic metal used in electrodes of this invention can be at least 50 atomic-% gold and, if desired, 75–100% gold, an anode of this invention is believed to be less sensitive than platinum to the presence of carbon monoxide in a hydrogen fuel and hence is less subject to carbon monoxide poisoning. Fuels which contain carbon monoxide or which contain or form carbonyl groups (e.g. $C_1$ to $C_6$ alcohols) can therefore be used in acid-electrolyte fuel cells of this invention.

An important advantage of alkaline fuel cells is that they can be operated at relatively low temperatures, e.g. from room temperature up to about 100° C. These low operating temperatures greatly simplify cell design and help to avoid loss of aqueous electrolyte due to evaporation. Alkaline fuel cells have not been as highly developed as acid fuel cells, however, due in part to the difficulty of providing suitable cathodes (e.g. air or oxygen cathodes). Anodes of this invention are extremely well suited for use in alkaline fuel cells. They are highly corrosion-resistant in the alkaline fuel cell environment, and they provide excellent current densities, e.g. 50 to 1000 mA/cm$^2$, preferably 100 to 400 mA/cm$^2$, when operated at about 0.4–1.2 volts, preferably 0.6–0.9 volts. The excellent performance of alkaline fuel cells of this invention at potentials of about 0.6 volts and higher (e.g. 200 mA/cm$^2$ current density) is believed to be indicative of the exclusive or nearly exclusive occurrence of the four-electron change reaction on the monocrystalline gold primary particles deposited on the support material. Thus, oxygen is apparently reduced to water or hydroxide on these gold surfaces, much like the reduction of oxygen to water or hydroxide observed in studies of Au(100) monocrystals. Any peroxide species which maybe present can apparently be reduced to water or hydroxide also. The support materials used in this invention can themselves participate in oxygen reduction and may contribute to peroxide formation, which is only a two-electron change. However, the performance of electrodes of their invention is not adversely affected to a significant degree by such peroxide formation.

Generally speaking, conventional fuel cell designs can be used in this invention. For example, a GDE can be in contact with a hydrogen fuel on the "gas" side of the GDE anode, and a flow of oxygen-containing gas or other oxidant can be in contact with the "gas" side of the GDE cathode. The "electrolyte" sides of the anode and cathode are, of course, in contact with the electrolyte, which can be liquid or solid and which can be divided by means of a conventional membrane into anolyte and catholyte spaces or compartments, if desired. In an anolyte/catholyte system, it is even possible to have completely different electrolytes in the cell compartments, in which case the membrane dividing the cell provides electrical contact between the compartments through ion exchange or the like rather than by permitting ions to migrate through the membrane.

Known GDE designs have been adapted for use with fluids other than gases, e.g. liquid fuels, solutions of soluble fuels, and the like at the anode and liquid oxidants or oxidant solutions at the cathode. The principle of a GDE is still applicable in these situations, because the structure of the electrode is designed to provide 3-phase interfacing in any event, i.e. contact between the electrolyte, the electrocatalytic material, and the fluid fuel or oxidant. This basic principle can be further modified for use in electrochemical synthesis, including the formation of desired organic products from organic starting materials by oxidation or reduction or reductive dimerization.

In alkaline fuel cells of this invention, the preferred fuel is hydrogen, and the preferred oxidant gas is air or pure oxygen. The evaluation of an electrocatalyst is commonly conducted in gas diffusion electrodes. These structures must be optimized for the various coupled physical phenomena which lead to good gas diffusion electrode performance. To be effective, the porous gas diffusion electrodes must be wetted by an appropriate amount of electrolyte. Low electrolyte content facilitates gas and liquid phase diffusion of reactants; however, it may result in high internal ohmic losses. Moreover, unwetted catalyst is inactive and not utilized. Conversely, high electrolyte content decreases internal ohmic losses; however, it increases diffusion losses due to flooding of catalytic sites. An electrode that is too thick suffers from excessive ohmic and gas diffusion losses, while an electrode that is too thin does not contain sufficient catalyst surface area to maximize performance. A performance parameter indicating the degree of optimization of electrode structure is the potential difference between pure oxygen and air at a given current density. For our electrocatalyst, we investigated the effect of 1) TEFLON content, 2) sintering temperature, 3) electrode thickness, and 4) gold loading, on electrode performances. For our presently preferred electrode, the difference in observed behavior between oxygen cathodes and air cathodes (the so-called "oxygen gain") is surprisingly small, e.g. less than 100 mv, more typically less than about 70 mv, e.g. 50 mv or less.

The art of metal/air or metal/oxygen cells is highly developed, and conventional cell designs can be used here also. Theoretically, any metal which stands above hydrogen in the electromotive series can be used as the anode (which becomes consumed and converted to a salt or, more typically, to an oxide, hydroxide, or the like—most metal/air cells being of the alkaline type), but practical considerations and simple cell design and conventional electrolyte considerations tend to rule out some of the more active metals. Performance factors and economic considerations also weigh heavily in the selection of suitable metals. As a result, most metal/air cells utilize zinc at the anode. Zinc is outstanding in terms of its performance, its relatively low cost, and its utility in the presence of conventional alkaline electrolytes. Moreover, the increasing concentration of zinc hydroxide in the electrolyte does not create significant performance problems. Zinc/air cells have made important contributions in the field of relatively light-weight portable sources of power, due to their favorable power/weight ratio as compared to lead/acid cells. Accordingly, these and other types of metal/air cells are particularly useful in small and miniaturized devices requiring a small and efficient battery (e.g. in hearing aids). Zinc/air cells also show considerable promise for larger applications, even for automotive use. The air or oxygen cathode of a zinc/air or other metal/air cell can be essentially the same as an air or oxygen cathode for a fuel cell in its design and function.

Other practical metal/air cells include Al/air, Fe/air, Li/air, Al/O$_2$, Fe/O$_2$ cells, etc. Hydrogen peroxide can be substituted for oxygen-containing gases at the cathode, as in the case of the Li/H$_2$O$_2$ cell.

The technology of this invention is useful in other types of electrochemical apparatus. Gas sensors are a commercially interesting example of such additional types of apparatus. The purpose of a gas sensor is to detect—or, more typically, to measure—the content of a particular gas in a gas stream. The gas stream is brought into contact with an an electrode, which can be an electrode of this invention. Oxidation or reduction of the gas to be measured (NO, O$_2$, SO$_2$, etc.) then becomes the means of detection and measurement. Typically, gas sensor cells operate at low current densities (<50 ma/cm$^2$, more typically <20 ma/cm$^2$). The electrolyte is preferably alkaline and can be aqueous, if desired. The opposing electrode is typically not electrocatalytically active but can, if desired, be electrochemically active. Thus, it is not necessary to use a relatively inert metal as the counterelectrode; as an anode, an oxidizable metal such as lead is entirely suitable. A gas sensor is therefore an essentially complete electrochemical cell having an anode, a cathode, and electrolyte in contact with the anode and the cathode. Typically, a small current is imposed on this cell, and reduction or oxidation of the gas component to be determined oxygen in the gas stream brought into contact with the gas side of the cathode or anode has an effect upon electrical measurement of the cell's performance. These electrical measurements can be correlated with the particular gas content in the gas stream, and with appropriate calibration, the sensor will report the particular gas content in any desired units.

In any of the electrochemical devices of this invention, suitable solid polymer electrolytes can be used. Liquid electrolytes are typically aqueous. In the case of acid electrolytes, the usual mineral acids ($H_2SO_4$, HCl, etc.) are operative, and phosphoric acid is particularly preferred. The preferred aqueous alkaline electrolytes are solutions of alkali metal hydroxides, particularly NaOH, KOH, LiOH, or mixtures thereof.

The principle and practice of this invention is illustrated in the following Examples without in any way limiting the scope of the invention.

EXAMPLE 1

Single-Stage Impregnation

Carbon black (KETJENBLACK EC 300J of Akzo Chemie America, Burt, New York, U.S.A.) was utilized as received from the manufacturer. Chloroauric acid ($HAuCl_4$ anhydrous, the tetrahydrate can also be used) was then dissolved in an 80:20 (volume/volume) mixture of isopropyl alcohol and water. The carbon black was impregnated with the resulting chloroauric acid solution until approximately 11 parts by weight of unreduced gold had been taken up by each 100 parts of carbon black, resulting in a composition which, as a dried solid, comprised 90% carbon and 10% unreduced gold. The isopropyl alcohol/water solvent mixture was removed in a rotary evaporator under vacuum at room temperature. Chloroauric acid-impregnated carbon was collected in the dry state and subjected to a hydrogen atmosphere at room temperature. This reducing atmosphere converted the chloroauric acid to gold, resulting in a material comprising 10% gold supported on carbon black. The dry gold-on-carbon material was formed into a paste with "TEFLON" (polytetrafluoroethylene) and coated onto a porous, paper-like carbon backing sheet, which was wet-proofed with FEP (fluorinated ethylene-propylene).

EXAMPLE 2

Staged Impregnation

The procedure of Example 1 was followed, except that the carbon black was not impregnated in a one-stage procedure. Four electrocatalytic layers of varying gold loadings were obtained by carrying out four impregnations (with reduction of the chloroauric acid prior to the beginning of the next impregnation). The intermediate results of these impregnations were preserved as well as the final product of all four impregnations, so that the performance of electrocatalytic materials with varying gold loadings could be compared. The resulting gold loadings were as follows:

| Example | Wt. % C | Wt. % Au |
| --- | --- | --- |
| 2A | 98 | 2 |
| 2B | 95 | 5 |
| 2C | 92.5 | 7.5 |
| 2D | 90 | 10 |

The materials listed above were incorporated into GDE air cathodes in the manner described in Example 1. For reasons which have not yet been determined, the first attempt to make Example 2A and fashion it into an air cathode did not meet the criteria of this invention. The performance of the first Example 2A electrode was indicative of a two-electron change. The open-circuit potential of this first Example 2A electrode was above 0.9 volt, and significant polarization was observed, making it difficult to operate the electrode at potentials above 0.6 volt.

For comparison purposes, an electrode was made from carbon black having a 0% gold loading. This electrode also exhibited significant polarization, making it difficult to obtain current densities in excess of 350 ma/cm$^2$.

The 5% Au, 7.5% Au, and 10% Au electrodes all performed extremely well. Open-circuit potentials were above 0.9 volt, polarization curves were relatively flat, and the electrodes could be operated at voltages above 0.6 volt all the way up to 800 ma/cm$^2$ and higher. Potentials were above 0.7 volt at current densities up to 400 ma/cm$^2$.

These performance data compared very favorably to a carbon-supported platinum GDE oxygen electrode. The open circuit potential of the platinum electrode was slightly above 1.0 volt, and the polarization curve was almost parallel to those of the gold electrodes of this invention, albeit translated upward about 0.1 volt.

The gold content of the cathode for the 10% Au-on-carbon electrode of this invention was 0.5 mg per geometric square centimeter of electrode surface.

Transmission electron microscopy (TEM) analysis of the electrodes of Examples 2B, 2C, and 2D is set forth below.

| Example | Gold Loading (Wt. % gold) | Number TEM's Examined | Total Number of Particles Examined | Average Gold Particle Size (angstrom units) |
| --- | --- | --- | --- | --- |
| 2B | 5 | 3 | 75 | 18 |
| 2C | 7.5 | 4 | 100 | 18 |
| 2D | 10 | 2 | 50 | 21 |
| 2D | 10 | 4 | 100 | 27* |

*Actual gold particle size in completed electrode.

All performance data discussed above are iR-corrected.

Figure 1:
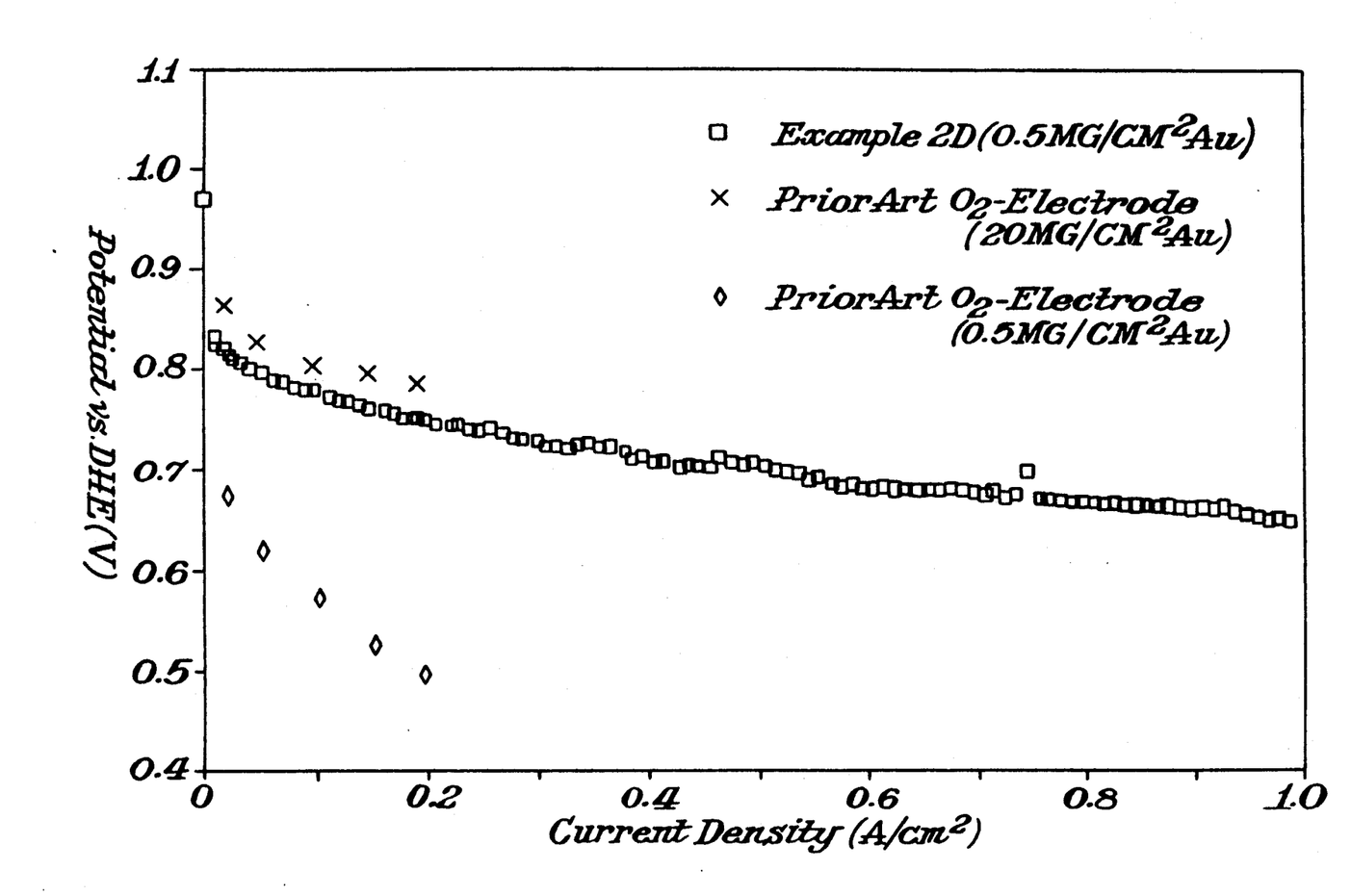

Turning now to the Drawing, the polarization curves for the electrode (oxygen or air cathode) of Example 2D is shown in the Drawing by square data points (□). It will be noted that this curve is roughly comparable to a NASA cathode ("X" data points) comprising unsupported gold mixed (unalloyed) with 10% platinum and dispersed in TEFLON and loaded onto an Au-plated Ni screen. This NASA alkaline fuel cell oxygen electrode is electrode no. 7, described in J. Singer et al, "Evaluation Parameters for the Alkaline Fuel Cell Oxygen Electrode", NASA Technical Memorandum 87155 (November, 1985); see also M. S. Freed et al, "Development of Gold Alloy Catalyst Cathode for Alkaline Electrolyte Fuel Cells", Electrochem. Soc. Meeting, Extended Abstracts, No. 44, Vol. 75-1, pages 93–95 (1975). The gold particles range from about 100 Å to several hundred Å units in size. This NASA electrode has about 40 times as much precious metal per geometric square centimeter as the Example 2D electrode.

The polarization curve shown by the diamond-shaped (◊) data points is for electrode no. 6 described in J. Singer et al, NASA Technical Memorandum 87155. Here the gold is supported, and the gold loading is about the same as that of Example 2D (0.5 mg/cm$^2$). The Au particle size ranges from about 18Å to 80Å with a central tendency of about 45Å. The support material is acetylene black and backing material is "carbon paper". The Au particles do not appear to have been formed by in-situ reduction of HauCl$_4$ with flowing H$_2$ gas at room temperature.

What is claimed is:

1. An electrochemical cell comprising a gas-diffusion cathode, an anode, an alkaline electrolyte, and electrical leads in contact with said gas-diffusion cathode and said anode, said gas-diffusion cathode comprising:

an active layer comprising a particulate support material having a surface area, by the B.E.T. method, of about 50 to about 2000 m$^2$/g,
    deposited on the particles of support material, 0.1 to 50 weight-%, based on the weight of said active layer, of a particulate elemental metal comprising monocrystalline gold primary particles having an average particle size, measured by transmission electrode microscopy, which is greater than 0.5 but less than about 4 nanometers,
    a gas-permeable, substantially hydrophobic backing layer, upon which the active layer is superposed, said gas-diffusion cathode having 0.1 to 5 mg of elemental gold per cm$^2$ of electrocatalytically active cathode surface;
    said monocrystalline gold primary particles substantially having (100) crystal faces or the functional equivalent thereof and being substantially selectively catalytic for the reduction of oxygen to water or hydroxide and for the reduction of peroxide ion to water or hydroxide.

2. An electrochemical cell according to claim 1, wherein the particulate support material comprises carbon black.

3. An electrochemical cell according to claim 1, wherein the amount of elemental gold per cm$^2$ of electrocatalytically active cathode surface is 0.1 to 2 mg and said amount is 0.1 to 15 weight-% based on the weight of the active layer.

4. An electrochemical cell according to claim 1, wherein the surface area, by the B.E.T. method, of the particulate support material is about 200 to about 2000 m$^2$/g.

5. An electrochemical cell according to claim 1 which further comprises means for bringing an oxygen-containing gas into contact with said gas-permeable, substantially hydrophobic backing layer, operation of said electrochemical cell resulting in the reduction of the oxygen in said oxygen-containing gas to water or hydroxide ion.

6. An electrochemical cell according to claim 1, wherein said monocrystalline gold primary particles have a surface area of at least about 50 m$^2$/g.

7. An alkaline fuel cell comprising the electrochemical cell of claim 1, said fuel cell being constructed and arranged to produce electricity through oxidation of a fuel at said anode and the reduction of an oxygen-containing gas at the cathode.

8. An alkaline fuel cell according to claim 7, said cell operating at >0.7 volt vs. RHE when providing at least 200 mA/cm$^2$ of current density.

9. An alkaline fuel cell according to claim 8, said cell being constructed and arranged for operation at temperatures below about 100° C.

10. An electrochemical cell according to claim 1, wherein the anode is a metal which stands above hydrogen in the electromotive series of metals, and the cell produces electricity through the oxidation of said metal at the anode and the reduction of oxygen-containing gas at the cathode.

11. A chlor-alkali production unit having reduced power requirements comprising the electrochemical cell of claim 1 and means for bringing an oxygen-containing gas into contact with said gas-permeable, substantially hydrophobic backing layer.

12. A chlor-alkali production unit according to claim 11, wherein chlorine is produced at the anode of said electrochemical cell.

13. An electrochemical caustic concentrator comprising the electrochemical cell of claim 1.

* * * * *